June 7, 1949.        D. C. HARVEY        2,472,587
BLADE AND COVER BLIND SHUTTER WITH
BUILT-IN FLASH SYNCHRONIZER
Filed Aug. 7, 1946
FIG. 1.
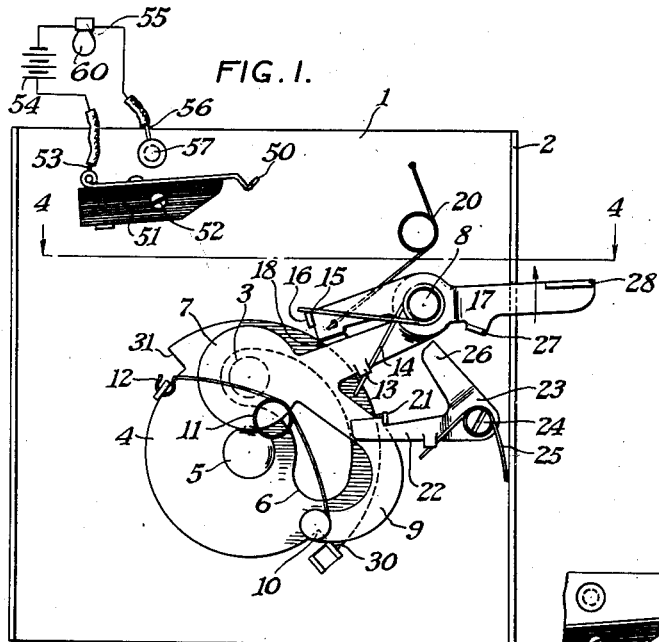
FIG. 5.
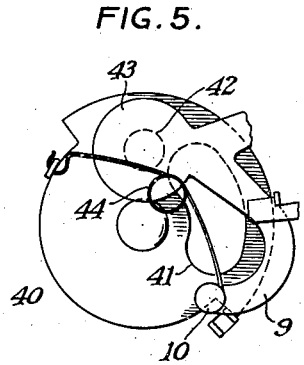
FIG. 2.
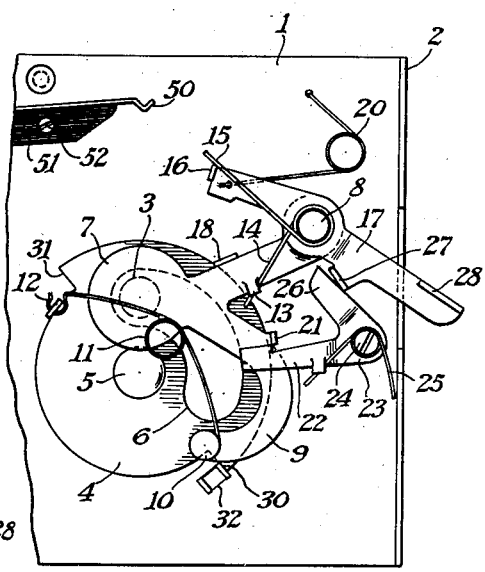
FIG. 3.
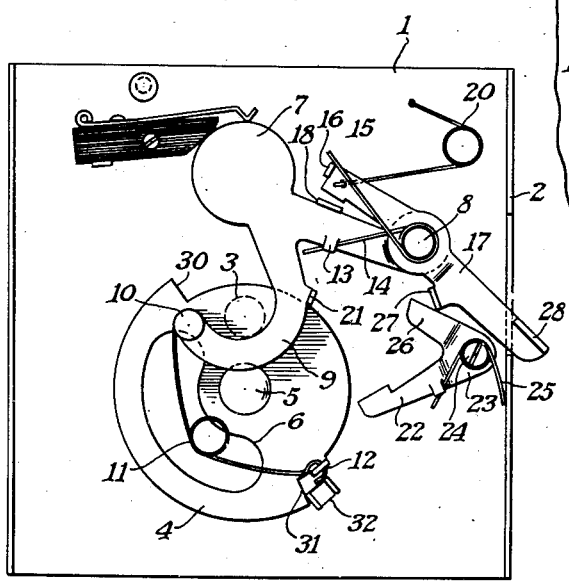
FIG. 4.
DOUGLASS C. HARVEY
INVENTOR
BY *[signatures]*
ATTORNEYS Patented June 7, 1949

2,472,587

UNITED STATES PATENT OFFICE 2,472,587

BLADE AND COVER BLIND SHUTTER WITH BUILT-IN FLASH SYNCHRONIZER

Douglass C. Harvey, Rochester, N. Y., assignor to Eastman Kodak Company, Rochester, N. Y., a corporation of New Jersey Application August 7, 1946, Serial No. 688,845

3 Claims. (Cl. 95—11.5)

This invention relates to photography and more particularly to inexpensive photographic shutters which include a means built into the shutter for synchronizing the operation of the shutter with a flash lamp. One object of my invention is to provide a simple type of shutter, such as used in inexpensive cameras, with a switch which will synchronize a flash lamp circuit with the operation of the shutter. Another object of my invention is to provide a shutter of the so-called blade and cover blind type in which the operation of a shutter part under spring power may close a circuit when the shutter parts are in a picture-taking position. A still further object of my invention is to provide a shutter in which the contact switch is so arranged that adequate contact between the switch members is made to insure that the proper circuit is made for firing the switch. Other objects will appear from the following specification, the novel features being particularly pointed out in the claims at the end thereof.

In my copending application Ser. No. 688,844, filed August 7, 1946, now Patent No. 2,443,164, issued June 8, 1948, for Blade and cover blind shutter, I have shown a shutter which can be readily equipped with the synchronizing switch which is the feature of the present invention.

In inexpensive shutters it is sometimes difficult to provide a flashlight circuit having a switch which can be positively closed by a part of the shutter mechanism without in any way altering the speed of operation of the shutter. It is customary to operate shutter blades with comparatively lightweight springs and, accordingly, any impediment in the path of the spring-operated part may alter the speed of the exposure which is, of course, undesirable. Moreover, it is not always easy to obtain a sufficiently firm contact between the switch members to keep the contact right and to operate properly regardless of the speed of depression of the trigger. In my improved form of flash-synchronizing shutter and switch, these difficulties have been overcome.

Coming now to the drawings wherein like reference characters denote like parts throughout:

Fig. 1 is a rear elevation of a shutter constructed in accordance with and embodying a preferred form of my invention, the shutter parts being shown in their normal position of rest;

Fig. 2 is a fragmentary view, similar to Fig. 1, but with the parts in the position they assume just before an exposure is made;

Fig. 3 is a view similar to Fig. 1 but with the parts in the position they assume after an exposure has been made;

Fig. 4 is a fragmentary section taken on line 4—4 of Fig. 1; and

Fig. 5 is a fragmentary detail of a shutter constructed in accordance with a second embodiment of my invention.

In the drawings I have illustrated my invention in two embodiments, and in each of these, the shutter is shown as being of the blade and cover blind type, being known as an automatic shutter in that it does not include a separate setting member.

My shutter consists broadly in a shutter blade and cover blind, and if a slow exposure is to be required, such as 1/30 of a second, I prefer to use the cover blind to start the exposure and the shutter blade to continue and terminate the exposure. If, on the other hand, a faster exposure is required, I prefer to both start and conclude the exposure with the shutter blade alone. The cover blind is definitely latched in a position to prevent accidental operation, and, as will be now fully pointed out, the construction is simple and consists of but few parts.

The support 1 may consist of a metal plate having flanges 2 for mounting it in a camera, and including an exposure aperture 3 through which light passes in making an exposure. It is obvious that the support may be made in any shape or form desired. A shutter blade 4 is pivoted on a stud 5 adjacent the exposure aperture and the shutter blade includes an arcuate slot 6 which swings past the exposure aperture 3 in making an exposure. Since the shutter now being described is intended to make an exposure of 1/30 of a second, the slot 6 is, as shown, of sufficient length to lie over the exposure aperture when the shutter blade 4 is in its rest position shown in Fig. 1. In this position the exposure aperture 3 is covered by the end 7 of a cover blind; this cover blind being pivoted on a stud 8 and including an offset arm 9 carrying a stud 10 which supports one end of a hairpin spring 11 attached at 12 to the shutter blade 4. The cover blind 7 includes a struck-up lug 13, beneath which one end 14 of a spring encircling the stud 8 is passed; the opposite end 15 of this spring engaging a lug 16 on a trigger member 17 which, in this instance, is pivoted also upon the stud 8. The cover blind includes a flange 18 lying in the path of the trigger member 17 so that when a spring 20 moves the trigger member 7 in the direction shown by the arrow in Fig. 1, the cover blind will also be moved.

The arm 9 carries an upstanding lug 21 which is engaged by a spring latch member 22 when the parts are in the position of rest in Fig. 1; this latch member being in the form of a bell crank lever 23 pivoted at 24 to the support. A spring 25 encircles the pivot 24 and normally holds the spring latch in the position shown. The arm 26 of the bell crank lever lies in the path of a lug 27 on the trigger so that it may be released when this lug engages the arm, as partially indicated in Fig. 2, where the releasing operation has been started but not yet completed. I prefer to provide a finger piece 28 on the trigger.

The operation of the shutter is as follows: In order to make an exposure, the finger piece 28 is depressed and the trigger is moved from its Fig. 1 to its Fig. 2 position. This accomplishes several purposes. First, it tensions the spring encircling the pivot 8 and gradually increases this spring tension up to the Fig. 2 position in which the lug 27 strikes the bell crank lever 26 and moves the latch 22 away from the cover blind lug 21. When the latch is released, the cover blind moves quickly from its Fig. 2 position to its Fig. 3 position. This causes the cover blind 7 to clear the exposure aperture 3 quite rapidly as it tensions and releases the hairpin spring 11 by which it is connected to the shutter blade 4. After the aperture 3 has been opened by the cover blind 7, the hairpin spring 11, having been tensioned and brought past dead center, causes the shutter blade 4 to swing so that the slot 6 continues and terminates the exposure started by the cover blind. The shutter blade finally reaches the Fig. 3 position. When in this position, the finger piece 28 is either suddenly or gradually released and the spring 20 will cause the trigger and cover blind to move together from the Fig. 3 to the Fig. 1 position in which the cover blind lug 21 will snap beneath the latch member 22, thereby holding the parts in their initial position of rest, as indicated in Fig. 1. Since the cover blind 7 is returned to its initial position, the hairpin spring 11 is again tensioned and released, and after the cover blind 7 has covered the exposure aperture 3, the shutter returns to its initial position.

In the present embodiment I prefer to provide a pair of spaced shoulders 30 and 31 on the shutter blade so that they may contact with a stop member 32 at each end of their movement. With a shutter constructed as above described, there is no danger of rebound at the termination of an exposure because the slot 6 moves well beyond the exposure aperture 3, as indicated in Fig. 3. When the parts return to their initial position of rest, there can be no accidental exposure because the cover blind 7 completely covers the exposure aperture 3 and is definitely latched in this position. Therefore, even if the shutter blade 4 should rebound, it would make no difference because the cover blind is latched in a light-excluding position.

If it should be desired to produce a shutter with a fast exposure as, for instance, $\frac{1}{80}$ of a second, the shutter blade may be modified, as shown in Fig. 5. In this form of my invention the shutter blade 40 is provided with a slot 41 which is considerably shorter than the slot 6 of the shutter blade 4. This slot does not lie over the exposure aperture 42 when the parts are in their position of rest, as shown in Fig. 5, so that when the cover blade 43 is moved away from the exposure aperture 42, the exposure does not start. The exposure is started by the hairpin spring 44 being tensioned and released when the slot 41 starts to uncover the aperture 42, so that the slot 41 both starts and terminates the exposure. It is a simple matter to provide quite a variety of exposures in an initial set-up by changing the strength of the shutter spring 44.

With my improved form of shutter, it is only necessary to determine how long an exposure is desired before making the shutter blade in order to provide a slot 41 of the proper length for the required exposure. As mentioned above, the slow-speed exposures, such as $\frac{1}{25}$ or $\frac{1}{30}$ of a second, are the most difficult to obtain using relatively-strong and positively-acting springs. For these slow speeds it is a simple matter to start the exposure through the opening of the cover blind which can be made to occur very quickly with the construction as above described.

With either of the shutter embodiments above described, a flash synchronizing circuit can be made to operate very satisfactorily in the following manner. The support 1 may carry a spring switch arm 50 which is preferably mounted on a block 51 of insulating material which may be attached to the support by means of one or more screws 52. The spring contact arm 50 is attached to one wire 53 of a circuit which includes a battery 54, a flash lamp socket 55, and a wire 56 which may be grounded at 57 upon the metal plate support 1. In order to close the circuit, a member connected directly with the grounded support 1 needs only to make contact with the spring contact 50 to fire lamp 60.

There are a number of requirements which should be met for the best operation of a device. First, the member which closes the switch should be operated independently of the speed of the operation of the trigger. Second, the member which closes the switch should be operated at a predetermined speed and preferably should move under the impulse of a relatively strong spring, so that adequate contact will be made. Third, the contact should not only be made firmly, but preferably the contact should be a wiping contact to keep the switch members bright and in a good operative condition. All these conditions are met by providing the spring-operated cover blind 7, as fully described above. Thus, when the trigger 28 is depressed, it is moved downwardly, tensioning the cover blind spring until the time when the trigger strikes the latch 22, as shown in Fig. 2, and when this latch has been moved far enough to release the latch element 21 of the cover blind, the cover blind moves upwardly quickly and firmly under the action of its spring until it contacts the switch element 50; moving this spring contact as indicated in Fig. 3, and causing a slight wiping contact therewith. Thus, the lamp circuit is closed and a flash lamp 60 will be fired in the proper timed relation to the operation of either the cover blind alone, as in the embodiment of my invention shown in the first four figures, or, in the proper timed relation with the shutter blade 40 alone, as indicated in Fig. 5. If the first embodiment of my invention is used, the contact member 50 can conveniently be placed a little closer than exposure aperture 3 in the second embodiment of my invention, because the exposure aperture 3 will be opened just as soon as the cover blind moves under the impulse of its spring. However, with the proportions shown in the drawings, I have found that the standard types of flash lamps having from three to twenty milliseconds delay will work satisfactorily.

Where the exposure is made solely by the slot 41 in the shutter blade 40, the contact 50 should be placed in such a position that contact is made through the operation of the cover blind 43 about the time the slot 41 starts to uncover the exposure aperture 42. If necessary, the screw 52 can be released and the insulating block 51 can be turned to bring the contact in the proper position.

With both embodiments of my invention, the speed of operation of the trigger has nothing to do with the speed of operation of the cover blind and, consequently, it is not a difficult matter to properly synchronize the operation of the shutter with the time of the maximum brilliance of the flash lamp 60. Moreover, in a production run of shutters with both embodiments of my invention, the movement of the cover blind can be so standardized that the switch contacts 50 can be placed in position without the usual individual testing of each shutter to be certain of the proper synchronization.

I claim:

1. A synchronizing shutter for cameras including, in combination, a support, having an exposure aperture therein, a shutter blade pivoted adjacent said aperture and having a slot through which an exposure may be made, a cover blind pivoted on the support, a spring connecting the blade and cover blind, a trigger pivoted on the support and connected to the cover blind by a spring, a cover blind latch for holding the cover blind in a normal position of rest, said latch lying in the path of movement of the trigger, a switch element lying in the path of movement of the cover blind, a flashlight circuit connected to the switch element, said spring connecting the trigger and the cover blind moving the latter at a predetermined speed into contact with the switch element to make the flashlight circuit when the spring is tensioned to a predetermined degree by the trigger moving to release the latch whereby said shutter blade may move past the exposure aperture, completing an exposure.

2. A synchronizing shutter for cameras including, in combination, a support having an exposure aperture therein, a shutter blade pivoted adjacent said aperture and having a slot through which an exposure may be made, a cover blind pivoted on the support, a spring connecting the blade and cover blind, a trigger pivoted on the support and connected to the cover blind by a spring, a cover blind latch for holding the cover blind in a normal position of rest, said latch lying in the path of movement of the trigger, a switch element lying in the path of movement of the cover blind, a flashlight circuit connected to the switch element, said spring connecting the trigger and the cover blind, moving the latter at a predetermined speed into contact with the switch element to make the flashlight circuit when the spring is tensioned to a predetermined degree by the trigger moving to release the latch whereby said shutter blade may move past the exposure aperture completing an exposure, and means carried by the trigger for engaging and moving the cover blind towards a rest position, breaking the flash circuit after the completion of an exposure.

3. A synchronizing shutter for cameras including, in combination, a support having an exposure aperture therein, a shutter blade pivoted adjacent said aperture and having a slot through which an exposure may be made, a cover blind pivoted on the support, a spring connecting the blade and cover blind, a trigger pivoted on the support and connected to the cover blind by a spring, a cover blind latch for holding the cover blind in a normal position of rest, said latch lying in the path of movement of the trigger, a switch element lying in the path of movement of the cover blind, a flashlight circuit connected to the switch element, said spring connecting the trigger and the cover blind, moving the latter at a predetermined speed into contact with the switch element to make the flashlight circuit when the spring is tensioned to a predetermined degree by the trigger moving to release the latch whereby said shutter blade may move past the exposure aperture completing an exposure, a spring acting on the trigger and having power to overcome the shutter blade spring and for moving the trigger and cover blind to a rest position in which said flashlight circuit is opened when the cover blind moves from contact with said switch member.

DOUGLASS C. HARVEY.

REFERENCES CITED

The following references are of record in the file of this patent:

UNITED STATES PATENTS

| Number | Name | Date |
| --- | --- | --- |
| 2,196,604 | Galter | Apr. 9, 1940 |
| 2,278,173 | Goering | Mar. 31, 1942 |
| 2,282,850 | Brownscombe | May 12, 1942 |